US012705826B2

(12) United States Patent
Fujioka et al.

(10) Patent No.: US 12,705,826 B2
(45) Date of Patent: Aug. 11, 2026

(54) COMPUTER, METHOD, AND COMPUTER-READABLE MEDIUM FOR RENDERING EXTENDED REALITY BASED ON A DETERMINED COORDINATE CONVERSION EQUATION

(71) Applicant: Wacom Co., Ltd., Saitama (JP)

(72) Inventors: Hiroshi Fujioka, Saitama (JP); Ryoichi Kikuchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 189 days.

(21) Appl. No.: 18/302,657

(22) Filed: Apr. 18, 2023

(65) Prior Publication Data

US 2023/0260210 A1 Aug. 17, 2023

Related U.S. Application Data

(63) Continuation of application No. PCT/JP2021/036458, filed on Oct. 1, 2021.

(30) Foreign Application Priority Data

Oct. 23, 2020 (JP) ................................ 2020-178397

(51) Int. Cl.
*G06T 17/00* (2006.01)
*G02B 27/01* (2006.01)
(Continued)

(52) U.S. Cl.
CPC .......... *G06T 17/00* (2013.01); *G02B 27/0172* (2013.01); *G06T 7/20* (2013.01); *G06T 7/70* (2017.01)

(58) Field of Classification Search
CPC .. G06T 17/00; G06T 7/70; G06T 7/20; G02B 27/0172
See application file for complete search history.

(56) References Cited

U.S. PATENT DOCUMENTS 10,127,732 B1 11/2018 Katz et al.
2005/0285879 A1 12/2005 Suzuki et al.
(Continued)

FOREIGN PATENT DOCUMENTS

JP 2005147894 A 6/2005
JP 2006048639 A 2/2006
(Continued)

OTHER PUBLICATIONS

International Search Report, mailed Dec. 7, 2021, for International Application No. PCT/JP2021/036458. (5 pages) (with English translation).

(Continued)

*Primary Examiner* — Terrell M Robinson
(74) *Attorney, Agent, or Firm* — Seed Intellectual Property Law Group LLP

(57) ABSTRACT

A computer according to the present disclosure includes a processor, and a storage device storing one or more programs that, when executed by the processor, cause the processor to: calculate first coordinates in a first coordinate system of a 3D object rendered in an XR space defined by the first coordinate system, calculate second coordinates in a second coordinate system different from the first coordinate system of a device tracked by a tracking system related to the second coordinate system, and calculate a coordinate conversion equation that converts coordinates of the second coordinate system into coordinates of the first coordinate system based on the first coordinates and the second coordinates, in response to a predetermined operation by a user. The computer enables easy use of a device compatible with a second tracking system in an XR space according to a first tracking system.

15 Claims, 8 Drawing Sheets

(51) Int. Cl.
*G06T 7/20* (2017.01)
*G06T 7/70* (2017.01)

(56) References Cited

U.S. PATENT DOCUMENTS

2010/0241998 A1* 9/2010 Latta ........................ G06F 3/011 715/862
2014/0176609 A1* 6/2014 Gotoda ................ G02B 27/017 345/633
2014/0267028 A1* 9/2014 Matsuda ............. G06F 3/04815 345/156
2016/0147410 A1 5/2016 Nam et al.
2017/0154471 A1* 6/2017 Woo ........................ G06F 3/011
2017/0336941 A1* 11/2017 Gribetz ................... G06T 19/20
2019/0126139 A1* 5/2019 Goslin .................... A63F 13/22
2019/0155374 A1* 5/2019 Miller ................... G06T 19/006
2019/0332182 A1* 10/2019 Shen ........................ G06F 3/011
2020/0058168 A1* 2/2020 Nocon .................... G06T 19/20
2020/0363867 A1* 11/2020 Azimi ................ G02B 27/0179
2020/0401245 A1 12/2020 Munakata et al.
2021/0142509 A1* 5/2021 Zhang .................... A61B 5/064

FOREIGN PATENT DOCUMENTS

JP 2016100024 A 5/2016
WO WO 2019152619 A1 8/2019
WO WO 2019161903 A1 8/2019
WO WO 2019175582 A1 9/2019
WO WO 2019181118 A1 9/2019

OTHER PUBLICATIONS

Extended European Search Report dated Feb. 12, 2024, for the corresponding 1 European Patent Application No. 21882536.2, 7 pages.

* cited by examiner

APPLICATION UNIT
20
COORDINATE CONVERSION PROCESSING UNIT
24
DEVICE INFORMATION ACQUISITION UNIT
23
10
TRACKING PROCESSING UNIT
22
XR SYSTEM UNIT
21
COUPLING DEVICE
14
CONTROLLER
CAMERA
HEAD-MOUNTED DISPLAY
CAMERA
CONTROLLER
C2
13a~13c
12
11a, 11b
C1
1
T2
T1

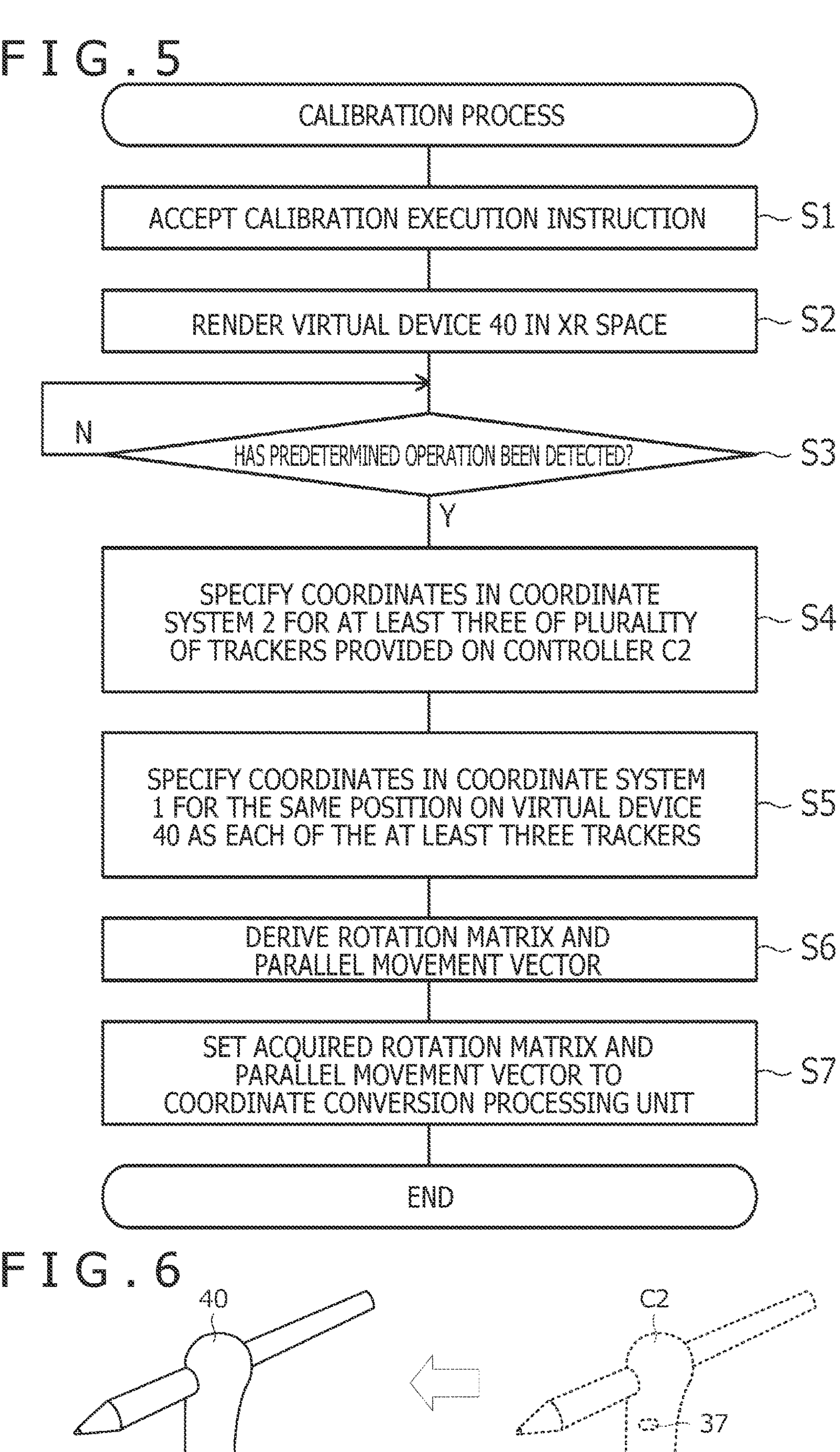
FIG. 5
CALIBRATION PROCESS
ACCEPT CALIBRATION EXECUTION INSTRUCTION
S1
RENDER VIRTUAL DEVICE 40 IN XR SPACE
S2
N
HAS PREDETERMINED OPERATION BEEN DETECTED?
S3
Y
SPECIFY COORDINATES IN COORDINATE SYSTEM 2 FOR AT LEAST THREE OF PLURALITY OF TRACKERS PROVIDED ON CONTROLLER C2
S4
SPECIFY COORDINATES IN COORDINATE SYSTEM 1 FOR THE SAME POSITION ON VIRTUAL DEVICE 40 AS EACH OF THE AT LEAST THREE TRACKERS
S5
DERIVE ROTATION MATRIX AND PARALLEL MOVEMENT VECTOR
S6
SET ACQUIRED ROTATION MATRIX AND PARALLEL MOVEMENT VECTOR TO COORDINATE CONVERSION PROCESSING UNIT
S7
END
FIG. 6
40
C2
37

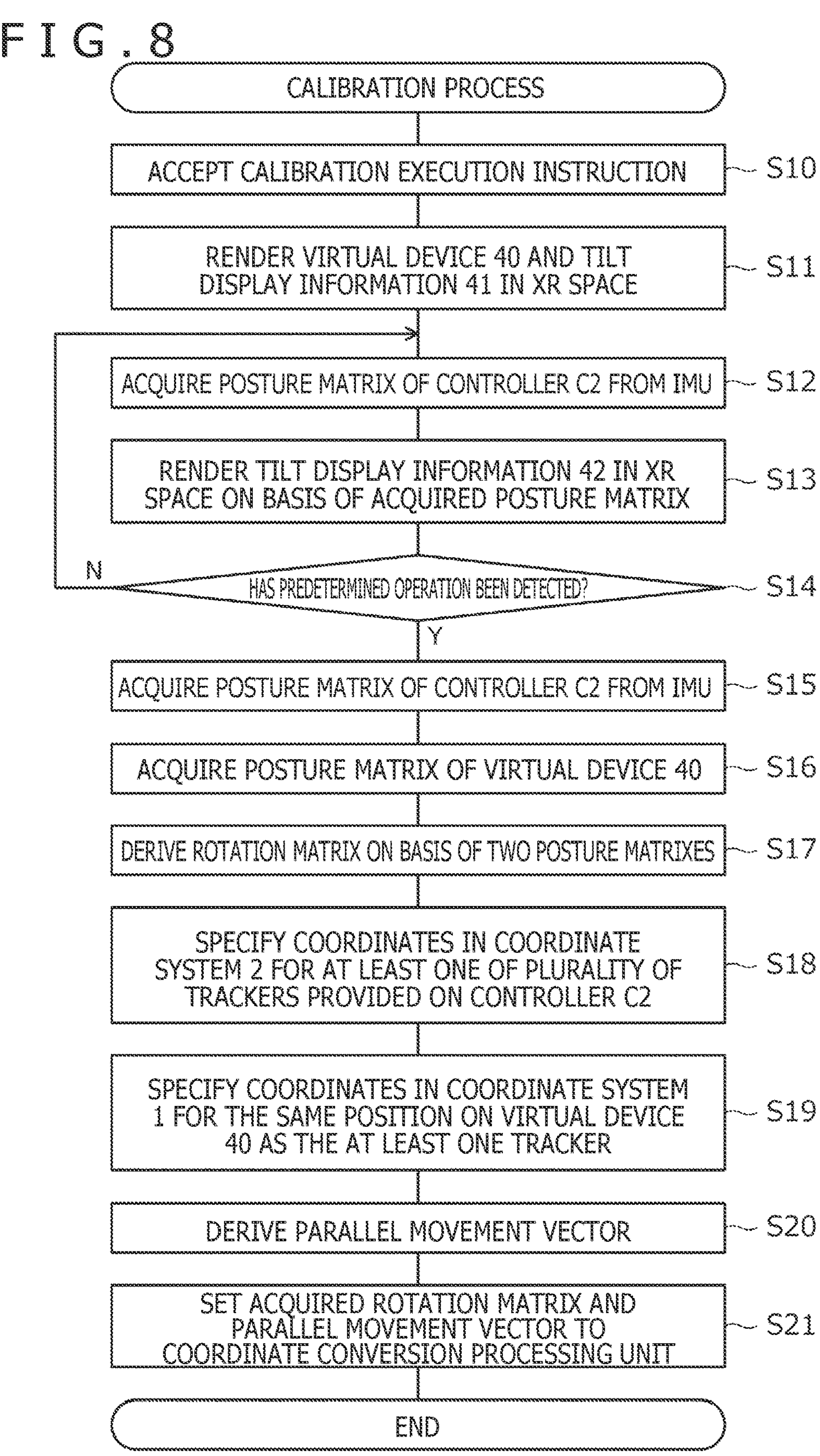
FIG. 8
CALIBRATION PROCESS
ACCEPT CALIBRATION EXECUTION INSTRUCTION
S10
RENDER VIRTUAL DEVICE 40 AND TILT DISPLAY INFORMATION 41 IN XR SPACE
S11
ACQUIRE POSTURE MATRIX OF CONTROLLER C2 FROM IMU
S12
RENDER TILT DISPLAY INFORMATION 42 IN XR SPACE ON BASIS OF ACQUIRED POSTURE MATRIX
S13
HAS PREDETERMINED OPERATION BEEN DETECTED?
S14
N
Y
ACQUIRE POSTURE MATRIX OF CONTROLLER C2 FROM IMU
S15
ACQUIRE POSTURE MATRIX OF VIRTUAL DEVICE 40
S16
DERIVE ROTATION MATRIX ON BASIS OF TWO POSTURE MATRIXES
S17
SPECIFY COORDINATES IN COORDINATE SYSTEM 2 FOR AT LEAST ONE OF PLURALITY OF TRACKERS PROVIDED ON CONTROLLER C2
S18
SPECIFY COORDINATES IN COORDINATE SYSTEM 1 FOR THE SAME POSITION ON VIRTUAL DEVICE 40 AS THE AT LEAST ONE TRACKER
S19
DERIVE PARALLEL MOVEMENT VECTOR
S20
SET ACQUIRED ROTATION MATRIX AND PARALLEL MOVEMENT VECTOR TO COORDINATE CONVERSION PROCESSING UNIT
S21
END

COMPUTER, METHOD, AND COMPUTER-READABLE MEDIUM FOR RENDERING EXTENDED REALITY BASED ON A DETERMINED COORDINATE CONVERSION EQUATION

BACKGROUND

Technical Field

The present disclosure relates to a computer, a method, and a computer-readable medium for rendering a three-dimensional (3D) object in a space configured using an extended reality (XR) technology such as virtual reality (VR), augmented reality (AR), mixed reality (MR), and substitutional reality (SR) (hereinafter, the space will be referred to as an "XR space").

Background Art

In the XR technology, a tracking system that detects positions and orientations of various devices such as a head-mounted display and a controller is used. A tracking system according to one example is configured to include a plurality of cameras and to determine the position and orientation of each device in the XR space on the basis of an image of each device imaged by each camera.

In addition, before starting to use the tracking system, calibration is performed to match the position and orientation of a device displayed in the XR space with the position and orientation of a real device. Patent Documents 1 and 2 describe examples of the calibration.

PRIOR ART DOCUMENT

Patent Documents

Patent Document 1: U.S. Pat. No. 10,127,732

Patent Document 2: PCT Patent Publication No. WO2019-175582

BRIEF SUMMARY

Technical Problem

In recent years, incidentally, the types of devices compatible with the XR technology have been diversified, and there has accordingly been a need for simultaneously using a plurality of devices manufactured by different vendors in a single XR space. However, devices that can be used in the XR space constructed using a tracking system of a certain vendor are limited to those compatible with the tracking system, and devices compatible with tracking systems of other vendors cannot easily be used in the XR space constructed using a tracking system of a certain vendor.

Therefore, one of the objects of the present disclosure is to provide a computer, a method, and a computer-readable medium that enable easy use of a device compatible with a second tracking system in an XR space according to a first tracking system.

Technical Solution

A computer according to the present disclosure includes a processor, and a storage device storing one or more programs that, when executed by the processor, cause the processor to: calculate first coordinates in a first coordinate system of a 3D object rendered in an XR space defined by the first coordinate system, calculate second coordinates in a second coordinate system different from the first coordinate system of a device tracked by a tracking system related to the second coordinate system, and calculate a coordinate conversion equation that converts coordinates of the second coordinate system into coordinates of the first coordinate system based on the first coordinates and the second coordinates, in response to a predetermined operation by a user.

The computer according to the present disclosure can also be configured in such a manner that the processor renders a virtual device in an XR space defined by a first coordinate system, calculates first coordinates in the first coordinate system of the virtual device rendered in the XR space, calculates second coordinates in a second coordinate system different from the first coordinate system of a tracker provided on a device tracked by a tracking system related to the second coordinate system, and calculates a coordinate conversion equation for converting coordinates of the second coordinate system into coordinates of the first coordinate system based on the calculated first coordinates and second coordinates, in response to a predetermined operation by a user.

A method according to the present disclosure is a method includes: calculating first coordinates in a first coordinate system of a 3D object rendered in an XR space defined by the first coordinate system, calculating second coordinates in a second coordinate system different from the first coordinate system of a device tracked by a tracking system related to the second coordinate system, and calculating a coordinate conversion equation that converts coordinates of the second coordinate system into coordinates of the first coordinate system based on the first coordinates and the second coordinates, in response to a predetermined operation by a user.

The method according to the present disclosure can also include rendering a virtual device in an XR space defined by a first coordinate system, calculating first coordinates in the first coordinate system of the virtual device rendered in the XR space, calculating second coordinates in a second coordinate system different from the first coordinate system of a tracker provided on a device tracked by a tracking system related to the second coordinate system, and calculating a coordinate conversion equation that converts coordinates of the second coordinate system into coordinates of the first coordinate system based on the calculated first coordinates and second coordinates, in response to a predetermined operation by a user.

A non-transitory computer-readable medium according to the present disclosure stores at least one a program which, when executed by the processor causes the processor to: calculate first coordinates in a first coordinate system of a 3D object rendered in an XR space defined by the first coordinate system, calculate second coordinates in a second coordinate system different from the first coordinate system of a device tracked by a tracking system related to the second coordinate system, and calculate a coordinate conversion equation for converting coordinates of the second coordinate system into coordinates of the first coordinate system based on the first coordinates and the second coordinates, in response to a predetermined operation by a user.

The program stored by the computer-readable medium according to the present disclosure can also be configured to cause a computer to render a virtual device in an XR space defined by a first coordinate system, calculate first coordinates in the first coordinate system of the virtual device rendered in the XR space, calculate second coordinates in a second coordinate system different from the first coordinate system of a tracker provided on a device tracked by a tracking system related to the second coordinate system, and calculate a coordinate conversion equation that converts coordinates of the second coordinate system into coordinates of the first coordinate system based on the calculated first coordinates and second coordinates, in response to a predetermined operation by a user.

Advantageous Effect

According to the present disclosure, it is possible to provide a computer, a method, and a computer-readable medium that enable easy use of a device compatible with a second tracking system in an XR space according to a first tracking system.

BRIEF DESCRIPTION OF THE SEVERAL VIEWS OF THE DRAWINGS

FIG. 5 is a flow chart illustrating a processing flow of a calibration process performed by an application unit 20 and a device information acquisition unit 23.

FIG. 6 is a diagram illustrating a virtual device 40 displayed at S2 of FIG. 5.

FIG. 8 is a flow chart illustrating a processing flow of a calibration process performed by the application unit 20 and the device information acquisition unit 23.

DETAILED DESCRIPTION

Hereinafter, embodiments of the present disclosure will be described in detail with reference to the attached drawings.

Figure 1:
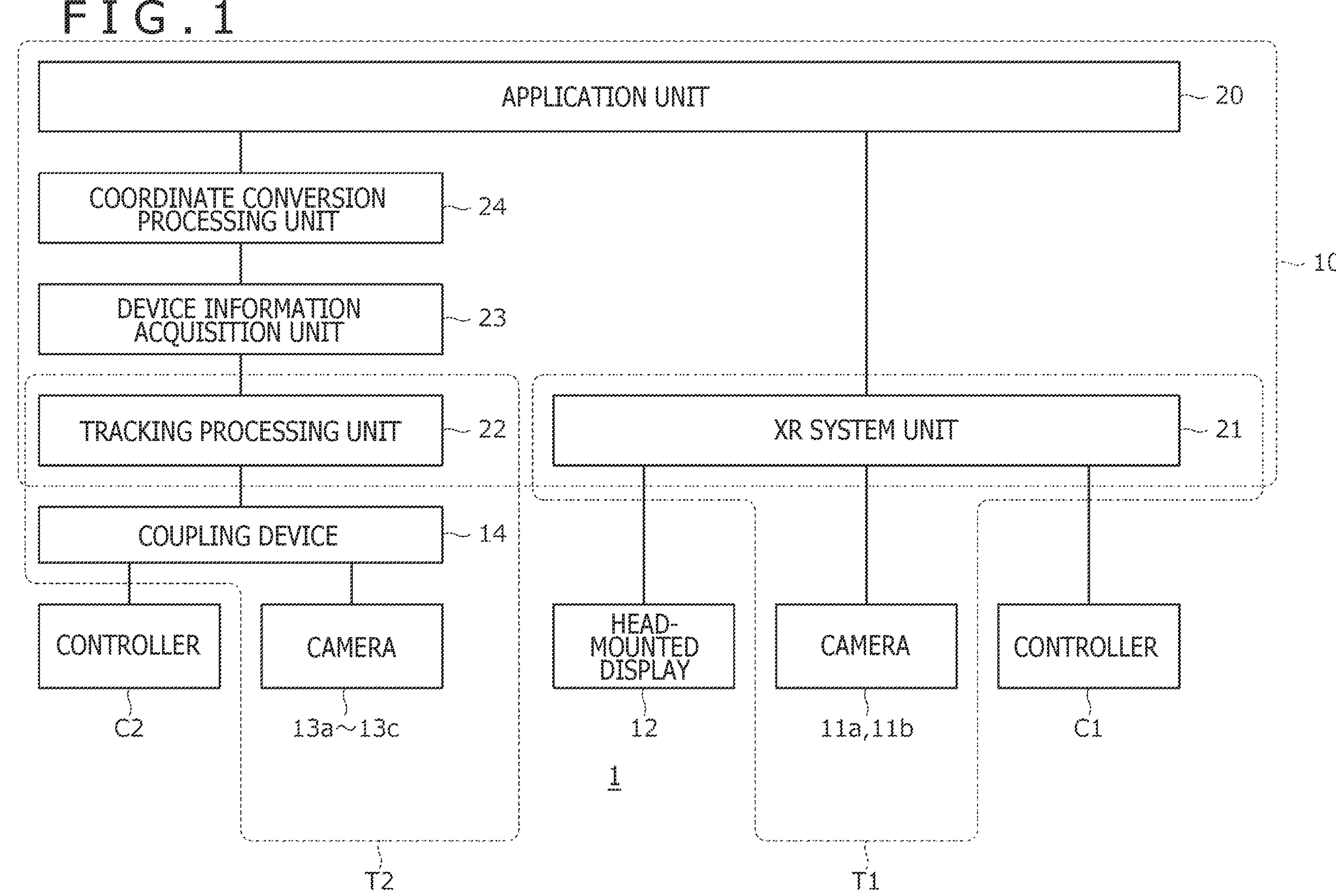
FIG. 1 is a schematic block diagram illustrating functional blocks of a 3D object rendering system 1 according to a first embodiment of the present disclosure.

FIG. 1 is a schematic block diagram illustrating functional blocks of a 3D object rendering system 1 according to a first embodiment of the present disclosure. In addition, FIG. 2 is a diagram illustrating an entire configuration of the 3D object rendering system 1.

First, referring to FIG. 1, the 3D object rendering system 1 is configured to have a computer 10, cameras 11*a* and 11*b*, a head-mounted display 12, cameras 13*a* to 13*c*, a coupling device 14, and controllers C1 and C2. In addition, the computer 10 is functionally configured to have an application unit 20, an XR system unit 21, a tracking processing unit 22, a device information acquisition unit 23, and a coordinate conversion processing unit 24.

The cameras 11*a* and 11*b*, the head-mounted display 12, the coupling device 14, and the controller C1 are configured to be capable of directly communicating with the computer 10 in a wired or wireless manner. In addition, the cameras 13*a* to 13*c* and the controller C2 are configured to be capable of directly communicating with the coupling device 14 in a wired or wireless manner and configured to be capable of communicating with the computer 10 via the coupling device 14. The cameras 11*a* and 11*b* and the XR system unit 21 configure a tracking system T1 for tracking the head-mounted display 12 and the controller C1 (detecting positions and tilts thereof), and the cameras 13*a* to 13*c*, the coupling device 14, and the tracking processing unit 22 configure a tracking system T2 for tracking the controller C2 (detecting a position and a tilt thereof).

Figure 2:
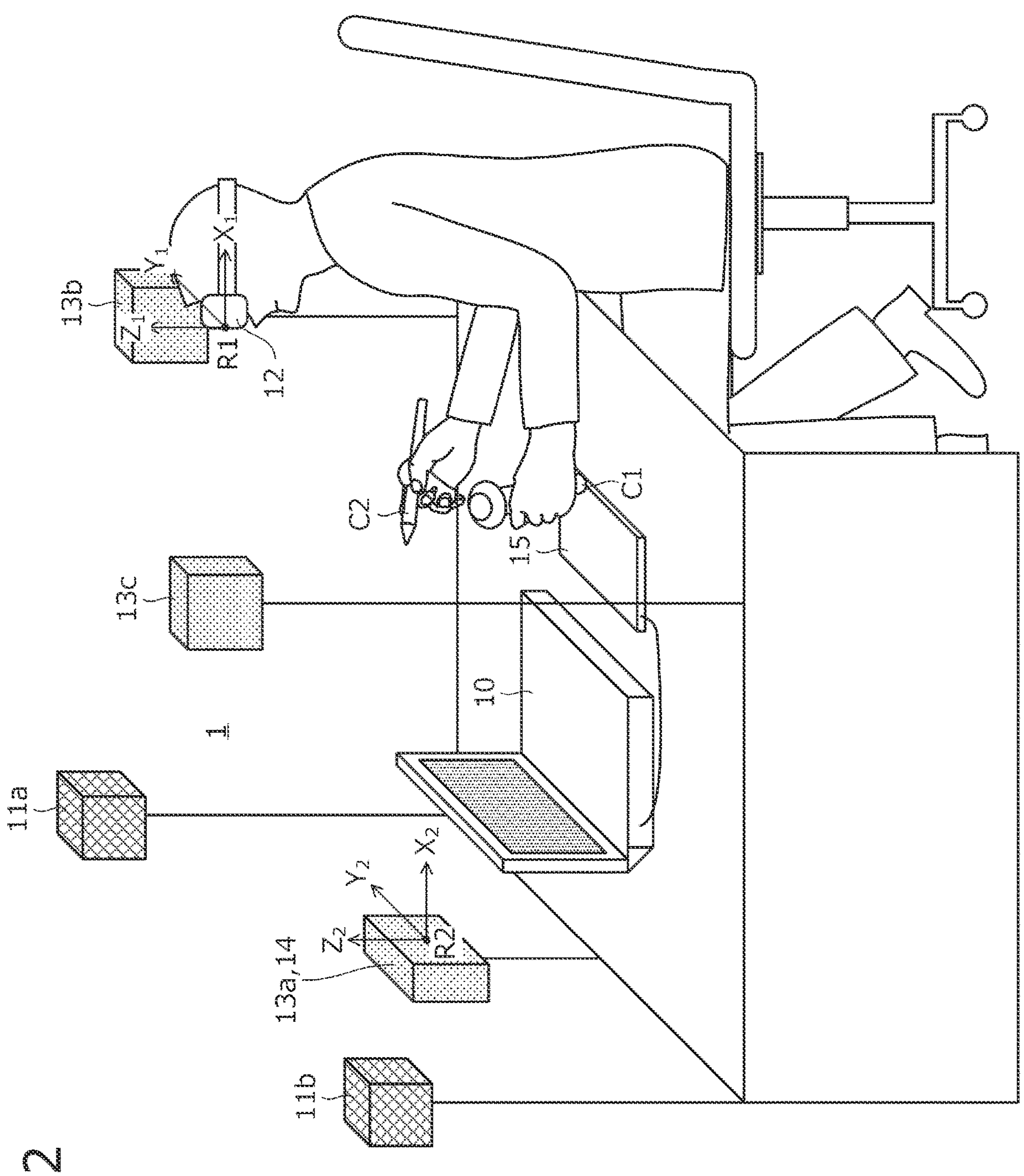
FIG. 2 is a diagram illustrating an entire configuration of the 3D object rendering system 1.

Next, referring to FIG. 2, the 3D object rendering system 1 is configured to further have a position detection device 15. The position detection device 15 is a device having a touch surface and having a function of detecting a position of an indicator on the touch surface. As an example, the position detection device 15 is a digitizer connected to the computer 10 in a wired or wireless manner and is configured to supply the detected position of the indicator to the computer 10 every time. It should be noted that, although the position detection device 15 and the computer 10 are depicted as separate devices in FIG. 2, the position detection device 15 may be a device built in the computer 10. In this case, a display of the computer 10 may also serve as the touch surface.

The cameras 11*a* and 11*b* and the cameras 13*a* to 13*c* are arranged in such a manner as to be able to photograph a space above a top plate of a desk where a user is seated. More specifically, the cameras 11*a* and 11*b* are installed above opposite ends of one side on a back side of the desk when viewed from the user. The camera 13*a* is installed above a center of the one side on the back side of the desk when viewed from the user. The cameras 13*b* and 13*c* are installed above positions closer to the user than a center of each side on both sides of the desk when viewed from the user. The coupling device 14 is built in the camera 13*a*.

The controllers C1 and C2 are devices each configured to be held by a hand of the user to be used. In addition, the head-mounted display 12 is a type of display device that is mounted to the head of the user, and is also configured to be capable of displaying a 3D video by projecting different videos to the left and right eyes.

The positions and tilts of the controller C1 and the head-mounted display 12 are detected by the tracking system T1 illustrated in FIG. 1. Specifically, the XR system unit 21 configuring the tracking system T1 detects the position and tilt of each of the controller C1 and the head-mounted display 12 on the basis of images photographed by the cameras 11*a* and 11*b*. As an example, the position detected by the XR system unit 21 is represented by coordinates in a coordinate system (a coordinate system illustrated in FIG. 2 with coordinate axes $X_1$, $Y_1$, and $Z_1$; hereinafter referred to as a "coordinate system 1") having a predetermined position of the head-mounted display 12 as the origin, and the tilt is represented by a quaternion indicating rotation in the coordinate system 1.

On the other hand, the position and tilt of the controller C2 are detected by the tracking system T2 illustrated in FIG. 1. Although the details will be described later, a plurality of trackers (a plurality of points as an example) are provided on a surface of the controller C2, and the tracking processing unit 22 configuring the tracking system T2 detects the position and tilt of the controller C2 by specifying at least three or more positions of these trackers on the basis of images photographed by the cameras 13*a* to 13*c*. As an example, the position detected by the tracking processing unit 22 is represented by coordinates in a coordinate system (a coordinate system illustrated in FIG. 2 with coordinate axes $X_2$, $Y_2$, and $Z_2$; hereinafter referred to as a "coordinate system 2") having a predetermined position of the coupling device 14 as the origin, and the tilt is represented by a rotation matrix indicating rotation in the coordinate system 2. However, as with the tilt detected by the XR system unit 21, the tilt of the controller C2 may be represented by a quaternion indicating the rotation in the coordinate system 2.

The computer 10 is configured using a notebook-type personal computer arranged in a center of the desk in the example of FIG. 2. However, the computer 10 need not be arranged in the center of the desk and may be arranged at a position communicable with the cameras 11*a* and 11*b*, the head-mounted display 12, the coupling device 14, and the controller C1. In addition, the computer 10 can be configured using various types of computers such as a desktop-type personal computer, a tablet-type personal computer, a smartphone, and a server computer, in addition to the notebook-type personal computer.

Figure 3:
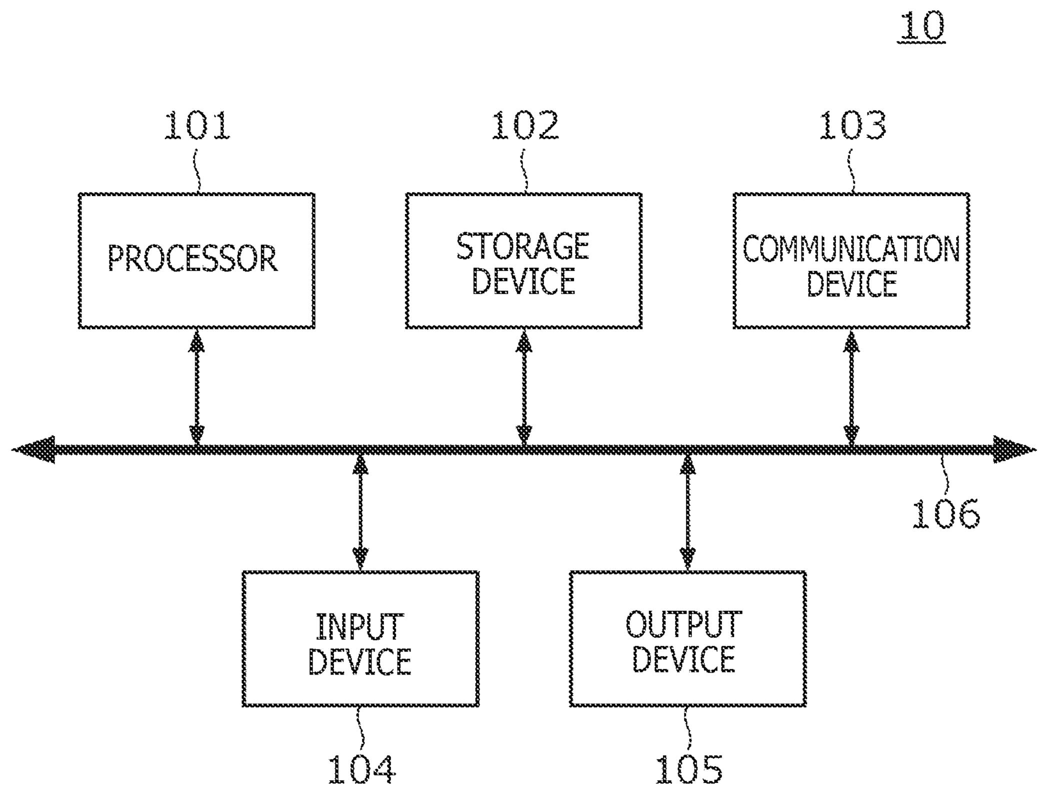
FIG. 3 is a diagram illustrating a basic hardware configuration of a computer 10.

FIG. 3 is a diagram illustrating a basic hardware configuration of the computer 10. As illustrated in the drawing, the computer 10 is configured to have a configuration in which a processor 101, a storage device 102, a communication device 103, an input device 104, and an output device 105 are connected to each other via a bus 106.

The processor 101 is a central processing unit that reads and executes programs stored in the storage device 102. Each of the application unit 20, the XR system unit 21, the tracking processing unit 22, the device information acquisition unit 23, and the coordinate conversion processing unit 24 illustrated in FIG. 1 is realized by the processor 101 reading and executing programs stored in the storage device 102. The processor 101 is configured to be capable of communicating with each unit in the server via the bus 106, and controls each unit and processes data stored in the storage device 102 in accordance with the description of the program to be executed.

The storage device 102 is a device that temporarily or permanently stores various programs and various kinds of data. The storage device 102 is generally configured using a combination of a plurality of storage devices, such as a main storage device configured using a dynamic random access memory (DRAM), a static random access memory (SRAM), or the like and an auxiliary storage device configured using a hard disk, a solid state drive (SSD), or the like.

The communication device 103 is a device that executes communication with external communication devices (including the cameras 11*a* and 11*b*, the head-mounted display 12, the coupling device 14, and the controller C1 illustrated in FIG. 1) under the control of the processor 101. A method of the communication performed by the communication device 103 is not particularly limited, and examples include a wired or wireless wide area network (WAN) or local area network (LAN), or short-range wireless communication such as Bluetooth (registered trademark).

The input device 104 is a device that accepts input from the user and includes various input means such as a mouse, a keyboard, and a touch panel. Contents of the user input accepted by the input device 104 are transmitted to the processor 101 via the bus 106. The output device 105 is a device that performs output to the user under the control of the processor 101 and includes various output means such as a display and a speaker.

Referring to FIG. 1 again, the XR system unit 21 is software for realizing an XR space in cooperation with the cameras 11*a* and 11*b*, the head-mounted display 12, and the controller C1 and is configured to have, in addition to the function of detecting the position and tilt of each of the head-mounted display 12 and the controller C1 as described above, a function of acquiring an operating state of an operation switch provided on a surface of the controller C1 or the like and a function of rendering the XR space on a display surface of the head-mounted display 12 on the basis of an instruction of the application unit 20.

The application unit 20 is, for example, an application compatible with the XR and has a function of providing the user with various experiences in the XR space through the XR system unit 21. As an example, the application unit 20 is sold in one set together with the XR system unit 21, the cameras 11*a* and 11*b*, the head-mounted display 12, and the controller C1. The application unit 20 constructs an XR space on the basis of a program preliminarily stored in the storage device 102 and renders a 3D object representing the controller C1 in the XR space on the basis of the position and tilt of the controller C1 detected by the XR system unit 21. In addition, the XR space is controlled according to the operating state of the operation switch acquired by the XR system unit 21.

The application unit 20 supplies information of the controlled XR space to the XR system unit 21. The XR system unit 21 sets a viewpoint of the user in the XR space on the basis of the detected position and tilt of the head-mounted display 12 and supplies a video viewed from this viewpoint to the head-mounted display 12. The head-mounted display 12 displays the video thus supplied, so that the user can have various experiences in the XR space.

The tracking processing unit 22 is configured to have the function of detecting the position and tilt of the controller C2 as described above and a function of acquiring an operating state of an operation switch provided on the surface of the controller C2 or the like. These pieces of data detected or acquired by the tracking processing unit 22 are supplied to the application unit 20 via the device information acquisition unit 23 and the coordinate conversion processing unit 24.

The device information acquisition unit 23 is software created by a software development kit supplied by a vendor of the application unit 20 and serves to supply the application unit 20 with the data detected or acquired by the tracking processing unit 22. The coordinate conversion processing unit 24 is plug-in software for the application unit 20 and serves to convert the position and tilt (the position and tilt in the coordinate system 2) supplied from the tracking processing unit 22 into a position and a tilt (a position and a tilt in the coordinate system 1) in the XR space. A specific method of the conversion (coordinate conversion equation) is determined by a calibration process performed by the application unit 20 and the device information acquisition unit 23. Details of the calibration process will be described in more detail later.

Figure 4A:
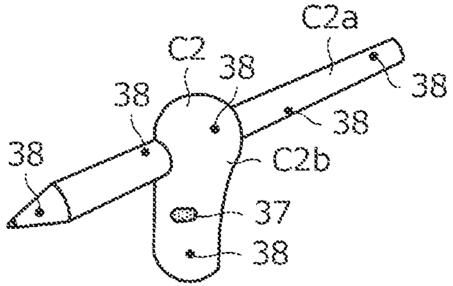
FIG. 4A is a diagram illustrating an appearance of a controller C2.
Figure 4B:
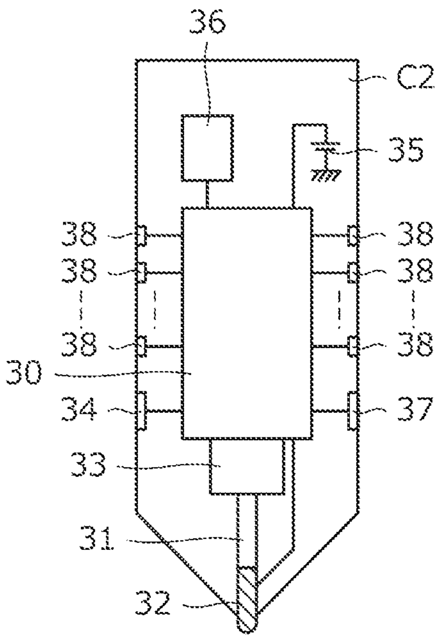
FIG. 4B is a diagram illustrating an internal configuration of the controller C2.

FIG. 4A is a diagram illustrating an appearance of the controller C2, and FIG. 4B is a diagram illustrating an internal configuration of the controller C2. First, referring to FIG. 4A, the controller C2 is a device having a shape in which a handle C2*b* is mounted to a center portion of a pen C2*a*. As illustrated in FIG. 2, the user uses the controller C2 in a state where the user grips a portion of the handle C2*b*.

As illustrated in FIG. 4B, the controller C2 is configured to have a control unit 30, a core body 31, a pen tip electrode 32, pressure sensors 33 and 34, a battery 35, a wireless communication unit 36, an operation switch 37, and a plurality of light emitting units 38.

The control unit 30 is a microprocessor that controls the entire controller C2. The core body 31 is a rod-like object arranged along a pen axis of the pen C2*a*, and a tip end thereof configures a pen tip of the pen C2*a*. A terminal end of the core body 31 is in contact with the pressure sensor 33. Through this contact, the pressure sensor 33 serves to acquire a pressure applied to the pen tip. The control unit 30 is configured to acquire the pressure acquired by the pressure sensor 33 as a pen pressure. The pressure sensor 34 is provided on the surface of the controller C2 and is a sensor for acquiring a force with which the user grips the controller C2. The control unit 30 is configured to acquire the force acquired by the pressure sensor 34 as a pen pressure. Accordingly, the control unit 30 can acquire the pen pressure even when using the controller C2 in a state where the pen tip is not in contact with a hard surface such as the touch surface.

The pen tip electrode 32 is a conductor arranged near the tip end of the core body 31 and is electrically connected to the control unit 30. The control unit 30 is configured to be capable of transmitting and receiving signals to and from the position detection device 15 in both directions or transmitting signals to the position detection device 15, via the pen tip electrode 32. The position detection device 15 is configured to acquire the position of the controller C2 on the touch surface by using the signal thus received from the controller C2 and to sequentially transmit information indicating the acquired position to the computer 10. The signal transmitted by the controller C2 to the position detection device 15 may include a value indicating the pen pressure acquired by the control unit 30 from the pressure sensor 33.

The control unit 30 is also configured to transmit, separately from the transmission of the signal to the position detection device 15, a value indicating the pen pressure acquired from the pressure sensor 34 to the coupling device 14 via the wireless communication unit 36. The coupling device 14 transmits the value indicating the pen pressure acquired from the pressure sensor 34 to the computer 10. In this way, the pen pressure can be generated even when the controller C2 is used in the air.

The battery 35 serves to supply an operating power of the controller C2 (including a power needed to make the light emitting units 38 to emit light). The wireless communication unit 36 is a communication unit for communicating with the coupling device 14 illustrated in FIG. 1 by, for example, short-range wireless communication such as Bluetooth (registered trademark). The control unit 30 communicates with the coupling device 14 via the wireless communication unit 36.

The operation switch 37 is a switch configured to be capable of being turned on and off by the user and is arranged on, for example, a surface of the handle C2*b* as exemplified in FIG. 4A. However, an arrangement position of the operation switch 37 is not particularly limited as long as the user can operate. The tracking processing unit 22 is configured to acquire the operating state of the operation switch 37.

The light emitting units 38 are, for example, light emitting diodes (LEDs) that emit light in an infrared region, and are arranged at various places on the surface of the controller C2 as exemplified in FIG. 4A. The light emitting units 38 configure the trackers described above, and the tracking processing unit 22 detects the position and tilt of the controller C2 by specifying positions of at least three or more of the light emitting units 38 on the basis of the images photographed by the cameras 13*a* to 13*c*. The controller C2 may be provided with at least eight light emitting units 38 so that the tracking processing unit 22 can specify the positions of at least three or more of the light emitting units 38 even in a case where a part of the controller C2 is hidden in the hand of the user and regardless of an angle of the controller C2.

Hereinafter, the calibration process performed by the application unit 20 and the device information acquisition unit 23 will be described in detail.

FIG. 5 is a flow chart illustrating a processing flow of the calibration process performed by the application unit 20 and the device information acquisition unit 23. In this process, first, a calibration execution instruction is accepted by the application unit 20 (S1). In one example, this instruction is made in the XR space by the user using the controller C1. Next, the application unit 20 renders a virtual device 40 representing the controller C2 in the XR space defined by the coordinate system 1 (S2). A position of the virtual device 40 in the coordinate system 1 in this rendering may preliminarily be set.

FIG. 6 is a diagram illustrating an example of the display of the virtual device 40 rendered at S2. As an example, the virtual device 40 is displayed on the head-mounted display 12. As illustrated in the drawing, the virtual device 40 has the same external shape as the controller C2. In a case where the XR space is a VR space, the controller C2 illustrated in the drawing is not visible to the user wearing the head-mounted display 12. The user moves the hand holding the controller C2 and uses the feeling of the hand to align the controller C2 with the position of the virtual device 40 being rendered in the XR space. Then, the operation switch 37 is pressed down in this state.

Here, an orientation of the virtual device 40 rendered at S2 is preferably set in such a manner that a portion corresponding to the pen C2*a* is horizontal or vertical. An error of a rotation matrix A to be described later can thus be reduced because the position alignment by the user is easier than a case where the portion corresponding to the pen C2*a* is inclined.

Referring back to FIG. 5, the device information acquisition unit 23 waits for a predetermined operation by the user while the virtual device 40 is displayed (S3). The predetermined operation is, as an example, a pressing operation of the operation switch 37. The device information acquisition unit 23 having detected the predetermined operation performs a series of processes in cooperation with the application unit 20 to calculate a coordinate conversion equation (S4 to S6) and set the calculated coordinate conversion equation to the coordinate conversion processing unit 24 (S7).

Specifically, the device information acquisition unit 23 first specifies coordinates VHP in the coordinate system 2 for at least three of the plurality of trackers (light emitting units 38) provided on the controller C2 (S4). In addition, the device information acquisition unit 23 causes the application unit 20 to specify coordinates VUP in the coordinate system 1 for the same position on the virtual device 40 as each of the at least three trackers (S5), and acquires the specified coordinates VUP.

Thereafter, the device information acquisition unit 23 derives the rotation matrix A and a parallel movement vector B by substituting the acquired three respective coordinates VUP and VHP into the following equation (1) (S6). Then, a coordinate conversion equation including the derived rotation matrix A and parallel movement vector B is set to the coordinate conversion processing unit 24 (S7), and the process is terminated. Thereafter, the coordinate conversion processing unit 24 uses the set rotation matrix A and parallel movement vector B to perform a process of converting the position and tilt supplied from the tracking processing unit 22 into a position and a tilt in the XR space.

$$VUP = A \times VHP + B \quad \text{(Equation 1)}$$

As described above, according to the computer 10 of the present embodiment, it is possible for the user wearing the head-mounted display 12 to move the hand holding the controller C2, align the position of the controller C2 with the virtual device 40 displayed in the XR space, then calculate, in response to the user operation of pressing the operation switch 37, the coordinate conversion equation (specifically, the rotation matrix A and the parallel movement vector B) for converting the coordinates in the coordinate system 2 into the coordinates in the coordinate system 1, and set the same to the coordinate conversion processing unit 24. Therefore, in the XR space constructed using the tracking system T1, it is possible to use the controller C2 compatible only with the tracking system T2.

Next, a 3D object rendering system 1 according to a second embodiment of the present disclosure will be described. The present embodiment is different from the first embodiment in that the controller C2 has an inertial measurement unit (IMU) and the tracking system T2 detects the tilt of the controller C2 from a measurement result of the IMU. The following is a detailed explanation focusing on the difference.

Figure 7:
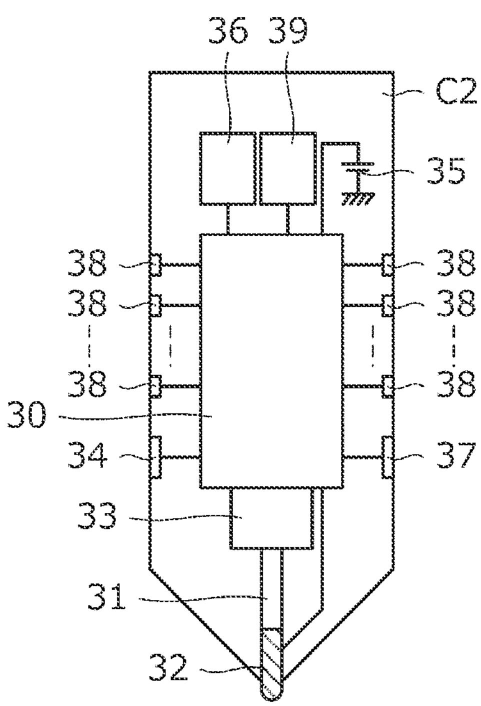
FIG. 7 is a diagram illustrating an internal configuration of a controller C2 according to a second embodiment of the present disclosure.

FIG. 7 is a diagram illustrating an internal configuration of the controller C2 according to the present embodiment. As can be understood by comparing the diagram with FIG. 4B, the controller C2 according to the present embodiment is different from the controller C2 according to the first embodiment in that an IMU 39 is provided. The IMU 39 is a unit incorporating a 3-axis gyroscope and a 3-direction accelerometer and serves to detect an angle and an acceleration of the controller C2 with three axes. The tracking processing unit 22 according to the present embodiment is configured to detect a tilt of the controller C2 in the coordinate system 2 on the basis of the angle and acceleration measured by the IMU 39. Specifically, this tilt is detected in the form of a 3 by 3 posture matrix.

FIG. 8 is a flow chart illustrating a processing flow of the calibration process performed by the application unit 20 and the device information acquisition unit 23 according to the present embodiment. The acceptance of a calibration execution instruction by the application unit 20 first (S10) is the same as the first embodiment. The application unit 20 having accepted the calibration execution instruction renders, in the XR space, tilt display information 41 indicating the tilt of the virtual device 40 in the coordinate system 1, in addition to rendering the virtual device 40 representing the controller C2 as with the first embodiment (S11).

Figure 9:
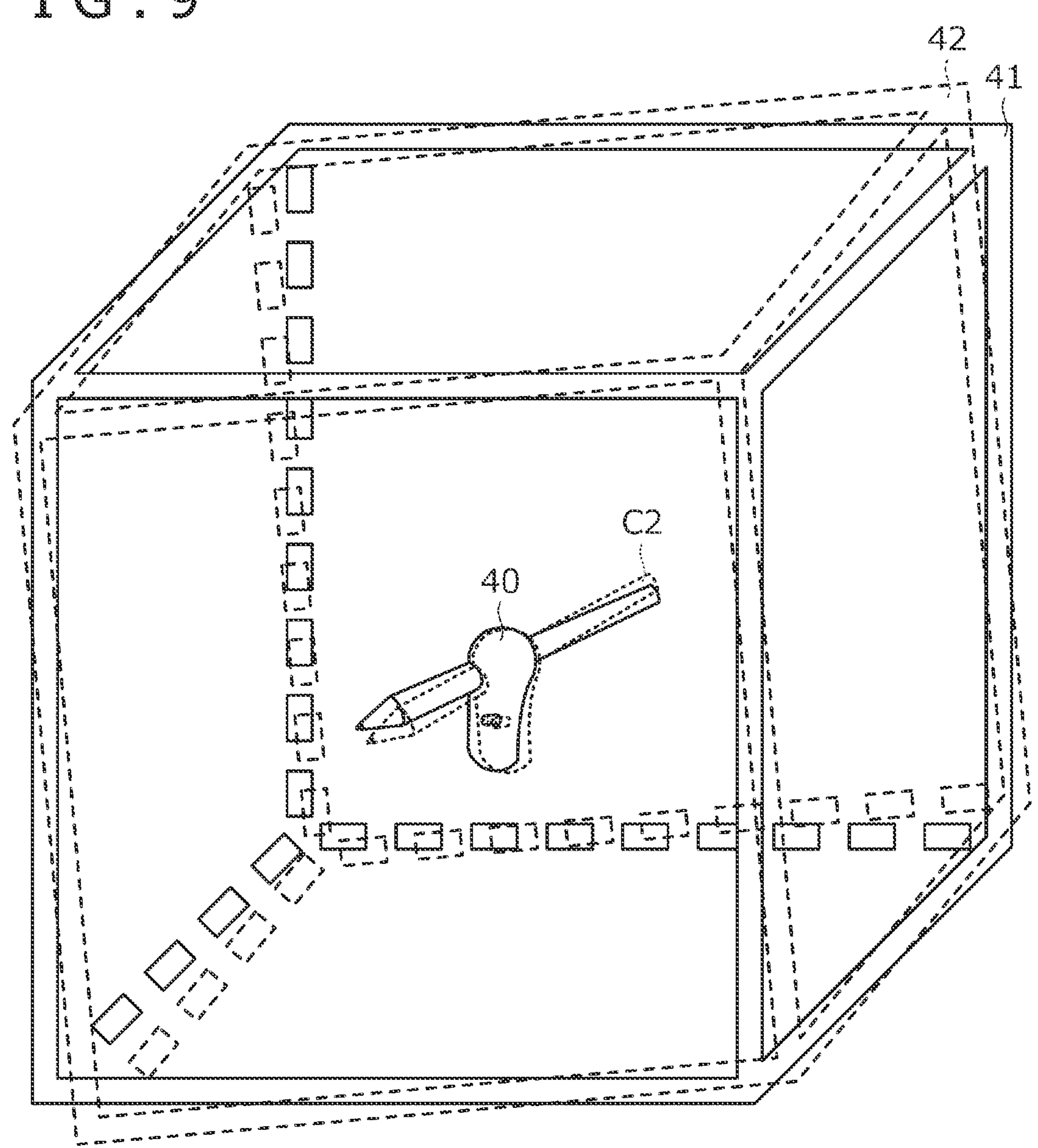
FIG. 9 is a diagram illustrating the virtual device 40 and tilt display information 41 displayed at S11 of FIG. 8.

FIG. 9 is a diagram illustrating the virtual device 40 and the tilt display information 41 rendered at S11. The tilt display information 41 is rendered in the XR space in the shape of a cube arranged in such a manner as to surround the virtual device 40. It is preferable that a size of the tilt display information 41 is sufficiently larger than the virtual device 40 in a range where the tilt display information 41 sufficiently falls within the eyesight of the user.

Referring back to FIG. 8, the device information acquisition unit 23 next acquires the posture matrix of the controller C2 on the basis of the measurement result of the IMU 39 (S12). Then, the application unit 20 renders tilt display information 42 in the XR space on the basis of the posture matrix acquired by the device information acquisition unit 23 (S13).

Referring to FIG. 9 again, the tilt display information 42 is also illustrated in the drawing. Although the tilt display information 42 is depicted by a dashed line in the drawing for the sake of convenience, the actual tilt display information 42 is displayed in such a manner as to be visible to the user in the XR space. The application unit 20 renders the tilt display information 42 on the basis of the position of the virtual device 40 in the XR space. Accordingly, the user can align the tilt of the controller C2 with the tilt of the virtual device 40 by matching the tilt display information 42 with the tilt display information 41, and hence, the positions of the controller C2 and the virtual device 40 can be aligned with each other with higher accuracy than a case where the position alignment is performed only with the virtual device 40.

Referring back to FIG. 8, the device information acquisition unit 23 waits for a predetermined operation by the user while the virtual device 40 is displayed (S14). The predetermined operation may be a pressing operation of the operation switch 37 as with the first embodiment. The device information acquisition unit 23 having detected the predetermined operation performs a series of processes in cooperation with the application unit 20 to calculate a coordinate conversion equation (S15 to S20) and set the calculated coordinate conversion equation to the coordinate conversion processing unit 24 (S21).

Specifically, the device information acquisition unit 23 first acquires a posture matrix VHR of the controller C2 on the basis of the measurement result of the IMU 39 (S15) and acquires a posture matrix VUR of the virtual device 40 from the application unit 20 (S16). Then, the rotation matrix A is derived by substituting the two acquired posture matrixes into the following equation (2) (S17).

$$VUR = A \times VHR \quad \text{(Equation 2)}$$

Next, the device information acquisition unit 23 specifies the coordinates VHP in the coordinate system 2 for at least one of a plurality of points (light emitting units 38) provided on the controller C2 (S18). In addition, the device information acquisition unit 23 causes the application unit 20 to specify the coordinates VUP in the coordinate system 1 for the same point of the virtual device 40 (S19) and acquires the specified coordinates VUP. Then, the parallel movement vector B is derived by substituting the acquired coordinates VHP and VUP and the rotation matrix A derived at S17 into the above equation (1) (S20).

Thereafter, the device information acquisition unit 23 sets the derived rotation matrix A and parallel movement vector B to the coordinate conversion processing unit 24 as the coordinate conversion equation (S21) and terminates the process. Thereafter, the coordinate conversion processing unit 24 uses the set rotation matrix A and parallel movement vector B to perform a process of converting the position and tilt supplied from the tracking processing unit 22 into a position and a tilt in the XR space.

As described above, according to the computer 10 of the present embodiment, since the tilt display information 41 and the tilt display information 42 are rendered in the XR space, the user can align the positions of the controller C2 and the virtual device 40 with each other with higher accuracy than in the first embodiment. Therefore, it is possible to calculate the coordinate conversion equation (specifically, the rotation matrix A and the parallel movement vector B) for converting the coordinates in the coordinate system 2 into the coordinates in the coordinate system 1 with higher accuracy and to set the same to the coordinate conversion processing unit 24.

Although the preferred embodiments of the present disclosure have been described above, it is obvious that the present disclosure is not limited to such embodiments at all, and the present disclosure can be carried out in various forms without departing from the gist thereof.

For example, the 3D object rendering system 1 utilizing a type of tracking system that detects a 3D object on the basis of the videos of the cameras has been described in the above embodiments, but the present disclosure is similarly applicable to a 3D object rendering system utilizing a type of tracking system that uses, for example, a laser.

DESCRIPTION OF REFERENCE SYMBOLS

1: 3D object rendering system
10: Computer
11*a*, 11*b*: Camera
12: Head-mounted display
13*a* to 13*c*: Camera
14: Coupling device
15: Position detection device
20: Application unit
21: XR system unit
22: Tracking processing unit
23: Device information acquisition unit
24: Coordinate conversion processing unit
30: Tracking system
30: Control unit
31: Core body
32: Pen tip electrode
33, 34: Pressure sensor
35: Battery
36: Wireless communication unit
37: Operation switch
38: Light emitting unit (tracker)
39: Inertial measurement unit
40: Virtual device
41, 42: Tilt display information
101: Processor
102: Storage device
103: Communication device
104: Input device
105: Output device
106: Bus
C1, C2: Controller
C2*a*: Pen
C2*b*: Handle
T1, T2: Tracking system

The invention claimed is:

1. A computer comprising:
a processor; and
a memory storing at least one program that, when executed by the processor, causes the processor to:
calculate first coordinates in a first coordinate system of a three-dimensional object rendered in an extended reality space defined by the first coordinate system, wherein the first coordinate system is of a first device tracked by a first tracking system, and the three-dimensional object is a virtual device corresponding to a second device and is displayed on a display;
calculate second coordinates in a second coordinate system of the second device tracked by a second tracking system related to the second coordinate system, wherein the second coordinate system is different from the first coordinate system; and
calculate a coordinate conversion equation that converts coordinates of the second coordinate system into coordinates of the first coordinate system based on the first coordinates and the second coordinates, in response to operation of an operation part provided in the second device while a user grips the second device and aligns the second device with the virtual device in the extended reality space.

2. The computer according to claim 1,
wherein the display is a head-mounted display.

3. The computer according to claim 1, wherein the at least one program, when executed by the processor, causes the processor to:
calculate, in response to the operation of the operation part provided in the second device, a plurality of coordinates in the second coordinate system of at least three of a plurality of trackers provided on the second device;
calculate a plurality of coordinates in the first coordinate system of each position on the three-dimensional object corresponding to each position of the at least three of the plurality of trackers; and
calculate the coordinate conversion equation by deriving a parallel movement vector and a rotation matrix based on the plurality of coordinates in the first coordinate system and the plurality of coordinates in the second coordinate system.

4. The computer according to claim 1, wherein the at least one program, when executed by the processor, causes the processor to:
control the display such that first information indicating a tilt of the three-dimensional object in the first coordinate system and second information indicating a tilt of the second device in the second coordinate system indicated by a measurement result of an inertial measurement unit included in the second device in the extended reality space together with the three-dimensional object.

5. The computer according to claim 1, wherein the at least one program, when executed by the processor, causes the processor to:
acquire a first matrix indicating a posture of the second device in the second coordinate system from an inertial measurement unit included in the second device;
acquire a second matrix indicating a posture of the three-dimensional object in the first coordinate system;
derive a rotation matrix based on the first matrix and the second matrix;
specify a plurality of coordinates in the second coordinate system of one of a plurality of points provided on the second device;
specify a plurality of coordinates in the first coordinate system of a point on the three-dimensional object corresponding to the one of the plurality of points provided on the second device; and
calculate the coordinate conversion equation by deriving a parallel movement vector based on the coordinates in the first coordinate system, the coordinates in the second coordinate system, and the rotation matrix.

6. A method comprising:
calculating first coordinates in a first coordinate system of a three-dimensional object rendered in an extended reality space defined by the first coordinate system, wherein the first coordinate system is of a first device tracked by a first tracking system, and the three-dimensional object is a virtual device corresponding to a second device and is displayed on a display;
calculating second coordinates in a second coordinate system of the second device tracked by a second tracking system related to the second coordinate system, wherein the second coordinate system is different from the first coordinate system; and calculating a coordinate conversion equation for converting coordinates of the second coordinate system into coordinates of the first coordinate system based on the first coordinates and the second coordinates, in response to operation of an operation part provided in the second device while a user grips the second device and aligns the second device with the virtual device in the extended reality space.

7. The method according to claim 6, wherein the display is a head-mounted display.

8. The method according to claim 6, further comprising:

calculating, in response to the operation of the operation part provided in the second device, a plurality of coordinates in the second coordinate system of at least three of a plurality of trackers provided on the second device;

calculating a plurality of coordinates in the first coordinate system for each position on the three-dimensional object corresponding to each position of the at least three of the plurality of trackers; and calculating the coordinate conversion equation by deriving a parallel movement vector and a rotation matrix based on the plurality of coordinates in the first coordinate system and the plurality of coordinates in the second coordinate system.

9. The method according to claim 6, further comprising:

controlling the display to display first information indicating a tilt of the three-dimensional object in the first coordinate system and second information indicating a tilt of the second device in the second coordinate system indicated by a measurement result of an inertial measurement unit included in the second device in the extended reality space together with the three-dimensional object.

10. The method according to claim 6, further comprising:

acquiring a first matrix indicating a posture of the second device in the second coordinate system from an inertial measurement unit included in the second device;

acquiring a second matrix indicating a posture of the three-dimensional object in the first coordinate system;

deriving a rotation matrix based on the first matrix and the second matrix;

specifying a plurality of coordinates in the second coordinate system of one of a plurality of points provided on the second device;

specifying a plurality of coordinates in the first coordinate system of a point on the three-dimensional object corresponding to the one of the plurality of points provided on the second device; and calculating the coordinate conversion equation by deriving a parallel movement vector based on the coordinates in the first coordinate system, the coordinates in the second coordinate system, and the rotation matrix.

11. A non-transitory computer-readable medium storing at least one program which, when executed by a processor, causes the processor to:

calculate first coordinates in a first coordinate system of a three-dimensional object rendered in an extended reality space defined by the first coordinate system, wherein the first coordinate system is of a first device tracked by a first tracking system, and the three-dimensional object is a virtual device corresponding to a second device and is displayed on a display;

calculate second coordinates in a second coordinate system of the second device tracked by a second tracking system related to the second coordinate system, wherein the second coordinate system is different from the first coordinate system; and calculate a coordinate conversion equation for converting coordinates of the second coordinate system into coordinates of the first coordinate system based on the first coordinates and the second coordinates, in response to operation of an operation part provided in the second device while a user grips the second device and aligns the second device with the virtual device in the extended reality space.

12. The computer-readable medium according to claim 11, wherein the display is a head-mounted display.

13. The computer-readable medium according to claim 11, wherein the at least one program, when executed by the processor, cause the processor to:

calculate, in response to the operation of the operation part provided in the second device, a plurality of coordinates in the second coordinate system of at least three of a plurality of trackers provided on the second device;

calculate a plurality of coordinates in the first coordinate system of each position on the three-dimensional object corresponding to each position of the at least three of the plurality of trackers; and calculate the coordinate conversion equation by deriving a parallel movement vector and a rotation matrix based on the plurality of coordinates in the first coordinate system and the plurality of coordinates in the second coordinate system.

14. The computer-readable medium according to claim 11, wherein the at least one program, when executed by the processor, cause the processor to:

control the display to display first information indicating a tilt of the three-dimensional object in the first coordinate system and second information indicating a tilt of the second device in the second coordinate system indicated by a measurement result of an inertial measurement unit included in the second device in the extended reality space together with the three-dimensional object.

15. The computer-readable medium according to claim 11, wherein the at least one program, when executed by the processor, cause the processor to:

acquire a first matrix indicating a posture of the second device in the second coordinate system from an inertial measurement unit included in the second device;

acquire a second matrix indicating a posture of the three-dimensional object in the first coordinate system;

derive a rotation matrix based on the first matrix and the second matrix;

specify a plurality of coordinates in the second coordinate system for one of a plurality of points provided on the second device;

specify a plurality of coordinates in the first coordinate system for a point on the three-dimensional object corresponding to the one of the plurality of points provided on the second device; and calculate the coordinate conversion equation by deriving a parallel movement vector based on the coordinates in the first coordinate system, the coordinates in the second coordinate system, and the rotation matrix.

* * * * *